United States Patent
Ramanchandran

(10) Patent No.: US 7,778,498 B2
(45) Date of Patent: Aug. 17, 2010

(54) SYSTEMS AND TECHNIQUES FOR GENERATING CYLINDRICAL VECTOR BEAMS

(75) Inventor: Siddharth Ramanchandran, Hoboken, NJ (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 12/368,147

(22) Filed: Feb. 9, 2009

(65) Prior Publication Data

US 2009/0202191 A1 Aug. 13, 2009

Related U.S. Application Data

(60) Provisional application No. 61/028,043, filed on Feb. 12, 2008.

(51) Int. Cl.
*G02B 6/00* (2006.01)
*G02B 6/02* (2006.01)

(52) U.S. Cl. .......................................... 385/11; 385/127

(58) Field of Classification Search .................. 385/11, 385/127; 398/141
See application file for complete search history.

(56) References Cited

U.S. PATENT DOCUMENTS

| 6,353,678 | B1* | 3/2002 | Guo et al. ................... 382/154 |
| 7,110,651 | B2 | 9/2006 | Golowich |
| 7,177,510 | B2 | 2/2007 | Ramachandran |
| 7,400,807 | B2* | 7/2008 | Minelly et al. .............. 385/124 |
| 7,483,612 | B2* | 1/2009 | Digiovanni et al. ......... 385/123 |

2006/0233554 A1* 10/2006 Ramachandran et al. .... 398/141

OTHER PUBLICATIONS

Dorn, R., S. Quabis, G. Leuchs, "Sharper focus for a radially polarized light beam", Physics Review Letters, vol. 91, No. 233901, (2003).*
Passilly, N., R de Saint Denis, K. Ait-Ameur, "Simple interferometric technique for generation of a radially polarized light beam", J. Opt. Soc. Am. vol. 22, No. 5, 984-91, (2005).*
Vengsarkar, A.M., et al., "Long-Period Fiber Gratings as Band-Rejection Filters," Journal of Lightwave Technology, vol. 14, No. 1, pp. 58-65, Jan. 1996.
Ramachandran, S., et al., "Lifting Polarization Degeneracy of Modes by Fiber Design: a Platform for Polarization-Insensitive Microbend Fiber Gratings," Optics Letters, vol. 30, No. 21, pp. 2864-2866, Nov. 2005.

* cited by examiner

*Primary Examiner*—Charlie Peng
(74) *Attorney, Agent, or Firm*—Jacobs & Kim LLP; Daniel Kim, Esq.

(57) ABSTRACT

A technique is described for generating a cylindrically polarized beam, e.g., a radially or azimuthally polarized beam. An input optical fiber is provided that supports signal propagation in a fundamental $LP_{01}$ mode. A mode converter device converts the fundamental $LP_{01}$ mode into a higher-order $LP_{11}$ mode output that includes a linear combination of modes, including cylindrically polarized $TM_{01}$ and $TE_{01}$ modes and mixed $HE_{21\ (even)}$ and $HE_{21\ (odd)}$ modes. The $LP_{11}$ mode output propagates through a connected phase-engineered fiber having a refractive index profile that includes a steep refractive index step proximate to a peak amplitude of a mode intensity profile of the $LP_{11}$ mode, such that at least one cylindrically polarized mode has an effective refractive index that is sufficiently separated from those of the mixed modes to allow for coupling to the at least one cylindrically polarized mode with minimal cross-coupling.

12 Claims, 8 Drawing Sheets

SYSTEMS AND TECHNIQUES FOR GENERATING CYLINDRICAL VECTOR BEAMS

CROSS-REFERENCE TO RELATED APPLICATIONS

This application for patent claims the priority benefit of U.S. Provisional Patent Application Ser. No. 61/028,043, filed on Feb. 12, 2008, which is hereby incorporated by reference in its entirety.

BACKGROUND OF THE INVENTION

1. Field of the Invention

The present invention relates generally to optical fiber devices and methods, and in particular to improved systems and techniques for generating cylindrical vector beams.

2. Description of Prior Art

A cylindrical vector beam is a polarized beam having a polarization state with rotational symmetry about the axis of the beam, and includes radially polarized beams and azimuthally polarized beams. Radially polarized beams in particular have recently attracted a significant amount of interest because of their unique properties. The longitudinal electric-field component generated when a radially polarized beam is focused with a high-numerical-aperture systems results in high intensities with a zero Poynting vector along the optical axis. This property enables longitudinal-field spot-sizes smaller than allowed by the diffraction limit, enhanced laser machining, efficient optical tweezers, and tailoring atomic dipole states for quantum information.

Current approaches for generating radially polarized beams using free-space resonators or fibers are fraught with instability problems. One issue that must be overcome in a fiber-based approach is that, within an optical fiber, radially polarized beams co-exist with other almost degenerate modes that share the same mode intensity profile but have different polarization-vector orientations. Inadvertent coupling between these modes produces the more familiar, rotationally unstable, first higher-order antisymmetric $LP_{11}$ mode pattern, rather than the desired radially polarized mode.

The rotationally unstable $LP_{11}$ mode resulting from the coupling of any two of the four almost degenerate modes in a multimode fiber is akin to a typical single-mode fiber (SMF), in which the conventional fundamental $LP_{01}$ mode is two-fold degenerate with identical intensity patterns but different polarization orientations.

The $LP_{11}$ field pattern not only rotates for even the slightest perturbations in the fiber, its polarization vector also changes orientation. Indeed, previous efforts at generating radially polarized modes with fibers have achieved it either in very short, straight segments, and/or with low modal purity in cavities similar to those employed with bulk laser rods.

SUMMARY OF THE INVENTION

These and other issues of the prior art are addressed by the present invention, one aspect of which provides a technique generating a cylindrically polarized beam, e.g., a radially polarized beam or an azimuthally polarized beam. An input optical fiber is provided that supports signal propagation in a fundamental $LP_{01}$ mode. The input fiber is coupled to a mode converter device that converts the fundamental $LP_{01}$ mode into a higher-order $LP_{11}$ mode output. The higher-order $LP_{11}$ mode comprises a linear combination of modes, including cylindrically polarized $TM_{01}$ and $TE_{01}$ modes, and mixed $HE_{21\ (even)}$ and $HE_{21\ (odd)}$ modes. The $LP_{11}$ mode output propagates through a phase-engineered fiber having a refractive index profile, where this profile includes a steep refractive index step proximate to a peak amplitude of a mode intensity profile of the scalar $LP_{11}$ mode, such that at least one cylindrically polarized mode has an effective refractive index that is sufficiently separated from the respective effective refractive indices of the other modes to allow coupling to the at least one cylindrically polarized mode with minimal coupling to the other modes. The desired cylindrically polarized mode is then provided as an output.

Additional features and advantages of the present invention will become apparent by reference to the following detailed description and accompanying drawings.

DETAILED DESCRIPTION

Figure 1:
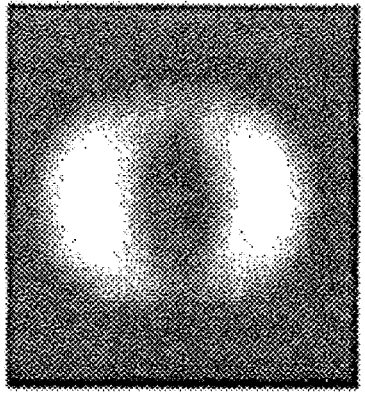
FIG. 1 is a modefield image of the first higher-order $LP_{11}$ mode.

The above issues and others are addressed by the present invention, aspects of which are directed to in-fiber systems and methods for generating cylindrically polarized beams, e.g., radially polarized beams and azimuthally polarized beams. These radially polarized beams, which are attractive for many scientific and technological applications, are generated as stable modes in an optical fiber. The described techniques yield a new class of fibers that are polarization-maintaining even though they are strictly cylindrically symmetric.

As described in greater detail below, the $LP_{11}$ mode comprises a linear combination of four component modes.

Because the $LP_{11}$ mode is almost degenerate, the four component modes have respective propagation constants that are close to each other in magnitude, but not identical. Generally speaking, the amount of separation between the propagation constants of the four components modes is so small that, using prior techniques, it is extremely difficult, if not impossible, to couple to any one of the four component modes without a significant amount of cross-coupling to one or more of the other component modes. The present invention provides fibers and techniques that greatly increase the separation between the propagation constant of a selected component mode and the other three component modes.

Depending upon the particular context, aspects of the present invention may be described herein with respect to the separation of the effective refractive index $n_{eff}$ of a selected component mode from the respective refractive indices of the other component modes. The effective refractive index $n_{eff}$ of a given mode is related to its propagation constant β as follows:

$$\beta = \frac{2\pi n_{eff}}{\lambda}$$

Thus, for a given wavelength λ, the effective refractive index $n_{eff}$ of a given mode is proportional to its propagation constant β. Therefore, any description of the invention using the term "propagation constant" is equally applicable to "effective refractive index," with the understanding that the two quantities are proportional to each other at a given wavelength.

An aspect of the invention provides a phase-engineered fiber that lifts polarization degeneracy of an anti symmetric $LP_{11}$ mode so that propagation constants of the vector components of the $LP_{11}$ mode are separated by a large magnitude. The described fiber provides stable guidance for both the fundamental, Gaussian-shaped $LP_{01}$ mode, as well as the radially polarized $TM_{01}$ mode.

The significantly increased separation of propagation constants allows fiber-grating-based excitation of a single desired mode, e.g., the radially polarized $TM_{01}$ mode, with exceptional modal purity, i.e., 99.6% or greater, when the input is a conventional Gaussian beam. Further, it will be appreciated that the techniques described herein have general application, and can be used to create a fiber device that can receive a Gaussian input from any source, including but not limited to high-power lasers, broadband sources, and the like, and convert the Gaussian input into a radially or azimuthally polarized beam output.

While group delay or dispersion engineering in fibers is well known, there are few demonstrations of altering the phase itself. One example in this regard is a polarization-maintaining fiber (PMF), in which the fiber is made sufficiently elliptical, in index or in geometry, so that the difference in the effective refractive index $n_{eff}$ between the fundamental modes with orthogonal polarizations is at least $1 \times 10^{-4}$.

Thus, the presently described techniques provide a new class of PMF that provides a large separation in propagation constants for cylindrical vector modes. It should further be noted that the design does not require geometric or index ovalities. The described techniques provide the first PMF that is cylindrically symmetric.

The development of a cylindrically symmetric PMF has several ramifications, including the following: (a) high-power PMF lasers and amplifiers are feasible since, radially, the described modes can achieve large mode areas; (b) no special PMF splicers are needed; further, because it is no longer necessary to align the PMF fiber prior to splicing, polarization extinction ratios (PERs) could potentially be improved; and (c) cylindrically symmetric PMFs may have lower manufacturing costs compared with other types of PMFs.

FIG. 1 shows the modefield intensity pattern 20 for the first higher-order mode $LP_{11}$ in a conventional fiber. As mentioned above, the $LP_{11}$ mode is antisymmetric and rotationally unstable. The $LP_{11}$ mode is actually a linear combination of four almost degenerate cylindrical vector modes: $TM_{01}$, $HE_{21(even)}$, $HE_{21(odd)}$, and $TE_{01}$. FIGS. 2A-D are a series of images illustrating the respective modefield intensity patterns for each of these modes. Further shown in FIGS. 2A-D are vector representations of the modes, indicated by arrows.

Figure 2A:
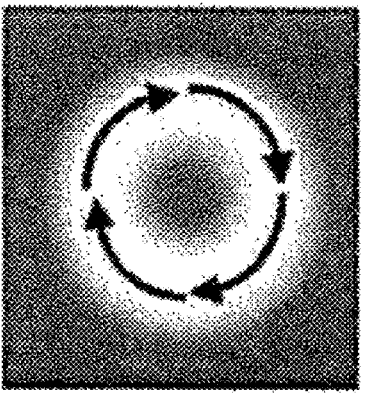
FIGS. 2A-D are a series of modefield images of the four almost degenerate modes for the $LP_{11}$ mode.
Figure 2B:
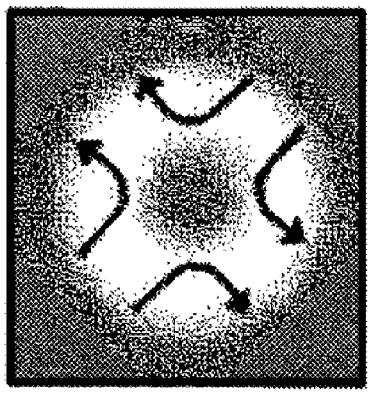
Figure 2C:
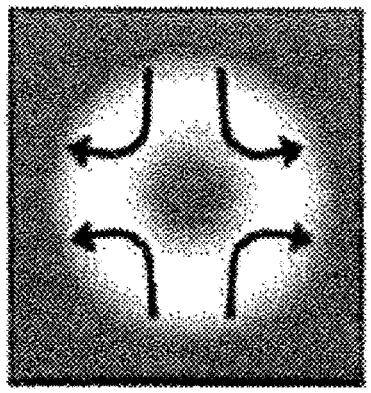
Figure 2D:
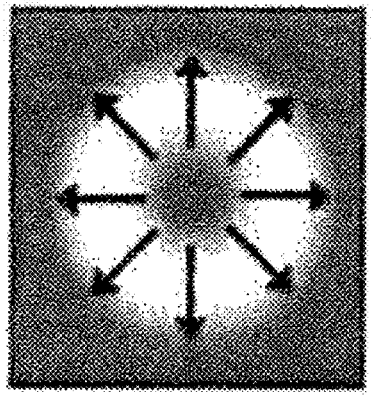

It will be seen that, when viewed in isolation, the $TM_{01}$ mode illustrated in FIG. 2A provides a radially polarized beam, and the $TE_{01}$ mode provides an azimuthally polarized beam. However, these modes are obscured by cross-coupling with the other modes, $HE_{21(even)}$ and $HE_{21(odd)}$. Further, in a typical multimode fiber, the four illustrated modes have propagation constants that, while different, are extremely close to each other. Thus, conventional techniques cannot be used to extract either the $TM_{01}$ or the $TE_{01}$ mode from the other modes.

An aspect of the invention provides a new polarization-maintaining fiber (PMF) that vastly increases the difference between the propagation constants of the cylindrically polarized $TM_{01}$ and $TE_{01}$ modes and that of the mixed $HE_{21\,(even)}$ and $HE_{21\,(odd)}$ modes. With a significantly distinct propagation constant, it is possible to couple to a desired cylindrically polarized mode with high modal purity. Further, the new PMF is cylindrically symmetric, which is advantageous for various reasons set forth above.

The new PMF design is based on first-order perturbative analysis, which shows that vector corrections to the propagation constants become large when scalar mode intensities are high at index steps. The four almost degenerate modes have identical electric-field amplitudes and differ only in their electric-field orientations. Thus, their propagation constants $$\beta = \frac{2\pi n_{eff}}{\lambda}$$

are similar, except for a vector correction arising from different electric field orientations at index-steps in the fiber waveguide.

The amount of this correction for each mode can be obtained from a first-order perturbative analysis:

$$\delta \beta_{TE_{01}} = 0 \qquad \text{(Eq. 1)}$$

$$\delta \beta_{TM_{01}} \propto 2(l_1 + l_2) \qquad \text{(Eq. 2)}$$

$$\delta \beta_{HE_{21}\,(even\;and\;odd)} \propto (l_1 - l_2) \qquad \text{(Eq. 3)}$$

where $$l_1 = \int r \cdot E(r) \cdot \frac{\partial E(r)}{\partial r} \cdot \frac{\partial F(r)}{\partial r} dr \qquad \text{(Eq. 4)}$$

and $$l_2 = \int E^2(r) \cdot \frac{\partial F(r)}{\partial r} dr \qquad \text{(Eq. 5)}$$

where E(r) is the electric-field profile for the scalar mode, and where F(r) is the normalized index profile of the fiber.

From Equations 1-5, it will be appreciated that it is possible to increase the degeneracy splittings by designing a waveguide having a refractive index profile with suitable values for $I_1$ and $I_2$, i.e., a refractive index profile having a steep refractive index step $$\frac{\partial F(r)}{\partial r}$$

proximate to the peak amplitude of the $LP_{11}$ scalar field E(r).

Figure 3:
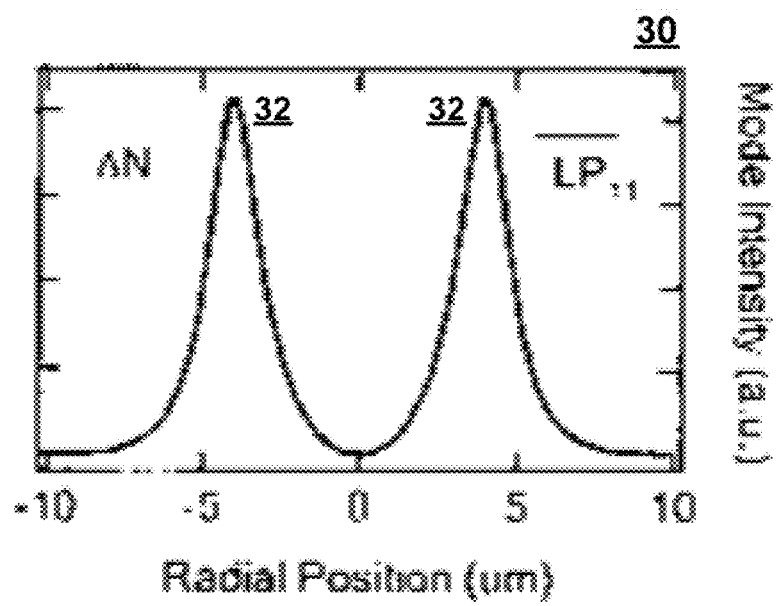
FIG. 3 is a mode intensity profile for the scalar $LP_{11}$ mode.

FIG. 3 shows a mode intensity profile 30 for the scalar $LP_{11}$ mode, in which mode intensity (y-axis) is plotted against radial position across the waveguide (x-axis). The "0" value on the x-axis represents the axial center of the waveguide. For purposes of illustration and comparison, mode intensity is expressed in arbitrary units. As shown in FIG. 3, in the present example, the scalar $LP_{11}$ mode has a generally M-shaped intensity profile, symmetrical around the center of the waveguide, with peaks 32 at approximately ±4 micrometers.

Figure 4:
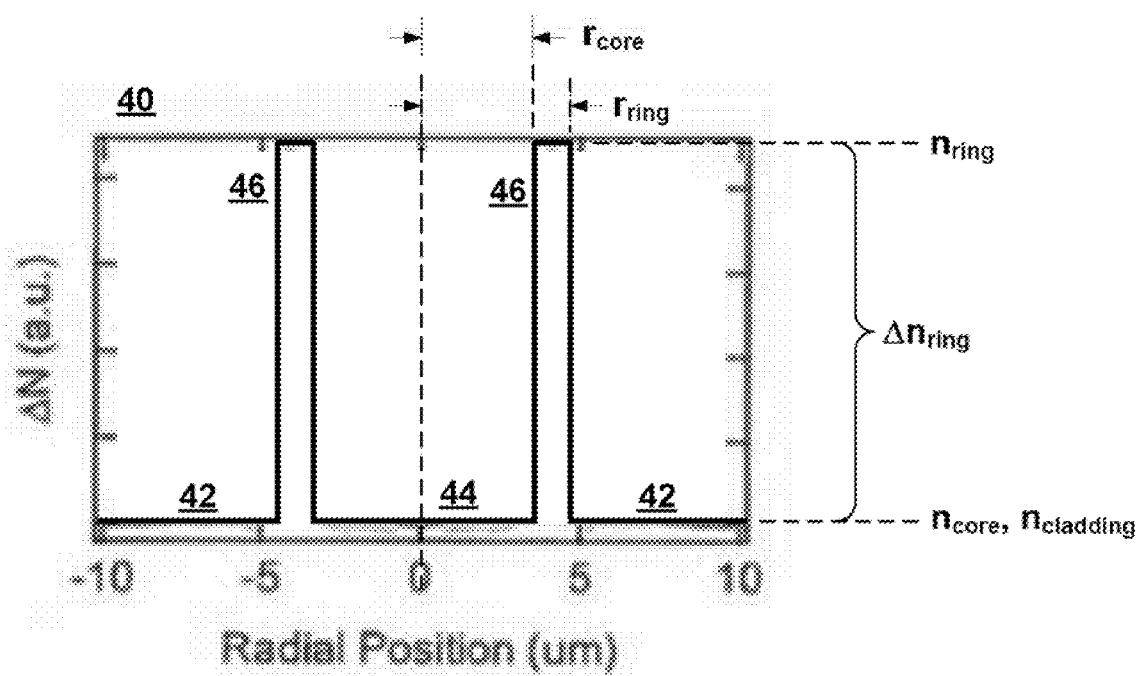
FIG. 4 is a desired refractive index profile for a phase-engineered fiber according to an aspect of the invention.

FIG. 4 shows a desired refractive index profile 40 for a phase-engineered fiber waveguide according to an aspect of the present invention. Again, for the purposes of illustration and comparison, the refractive index profile is expressed in arbitrary units. The fiber includes an outer cladding region 42 having a radius $r_{cladding}$ (FIG. 5) and a refractive index $n_{cladding}$. The cladding refractive index $n_{cladding}$ is used as a reference value in determining the effective refractive index $\Delta n$ for the other fiber regions.

The fiber includes a flat core region 44 having a radius $r_{core}$, and a refractive index $n_{core}$. The core effective refractive index $\Delta n_{core}$ is determined by subtracting from $n_{core}$ the cladding refractive index $n_{cladding}$, i.e., $\Delta n_{core} = n_{core} - n_{cladding}$. In the present example of the fiber, $\Delta n_{core}$ is equal to zero.

The core region 44 is surrounded by a ring region 46 having an inner radius equal to $r_{core}$, an outer radius $r_{ring}$, and a refractive index $n_{ring}$. As shown in FIG. 4, the ring region 46 has a relatively large effective refractive index $\Delta n_{ring} = n_{ring} - n_{cladding}$, and is depicted as a steep step. The ring region 46 is in turn surrounded by the outer cladding region 42.

As discussed above, the steeply stepped ring region 46 is located proximate to the amplitude peaks 32 of the mode intensity profile of the scalar $LP_{11}$ mode 30, shown in FIG. 3. The ring effective refractive index $\Delta n_{ring}$ should have a value that is sufficiently high to cause the desired separation of the propagation constants of the $LP_{11}$ modes. Generally speaking, $\Delta n_{ring}$ should be approximately 0.015 or greater. In particular, both $n_{ring} - n_{core}$ and $n_{ring} - n_{cladding}$ should each be approximately 0.015 or greater.

Figure 5:
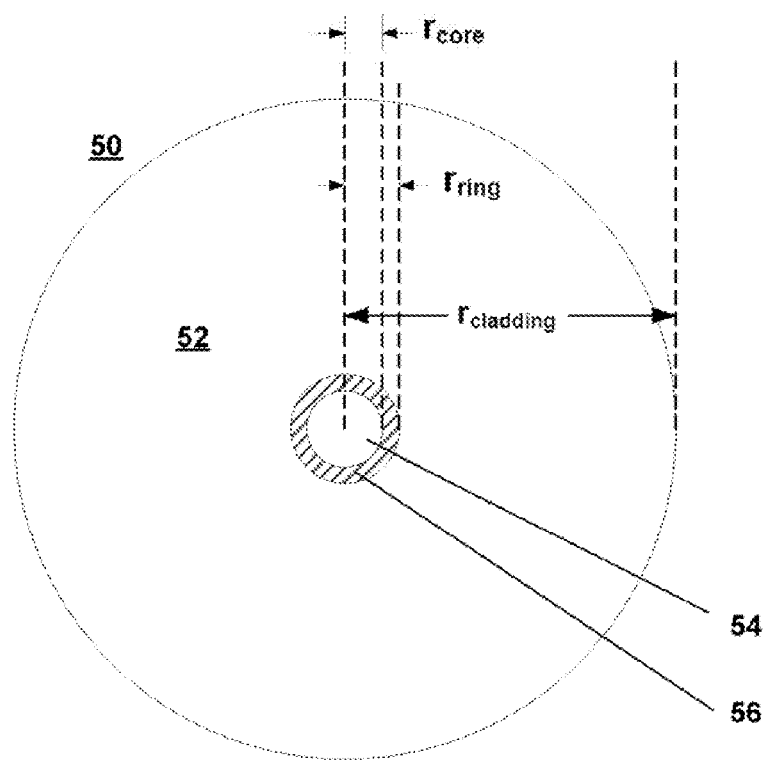
FIG. 5 is a cross section, not drawn to scale, of a fiber manufactured according to the FIG. 4 refractive index profile.

FIG. 5 is a cross section, not drawn to scale, of a fiber 50 manufactured according to the refractive index profile 40 shown in FIG. 4. The fiber includes an outer cladding 52, a core region 54, and a ring region 56. The fiber 50 may be fabricated from $SiO_2$ or other suitable material, using a modified chemical vapor deposition (MCVD) technique, or other suitable technique. The outer cladding region 52 and core region 54 are undoped. The ring region 56 is formed by doping it with a suitable index-raising dopant, or mixture of dopants, such as $GeO_2$, or the like.

Figure 6:
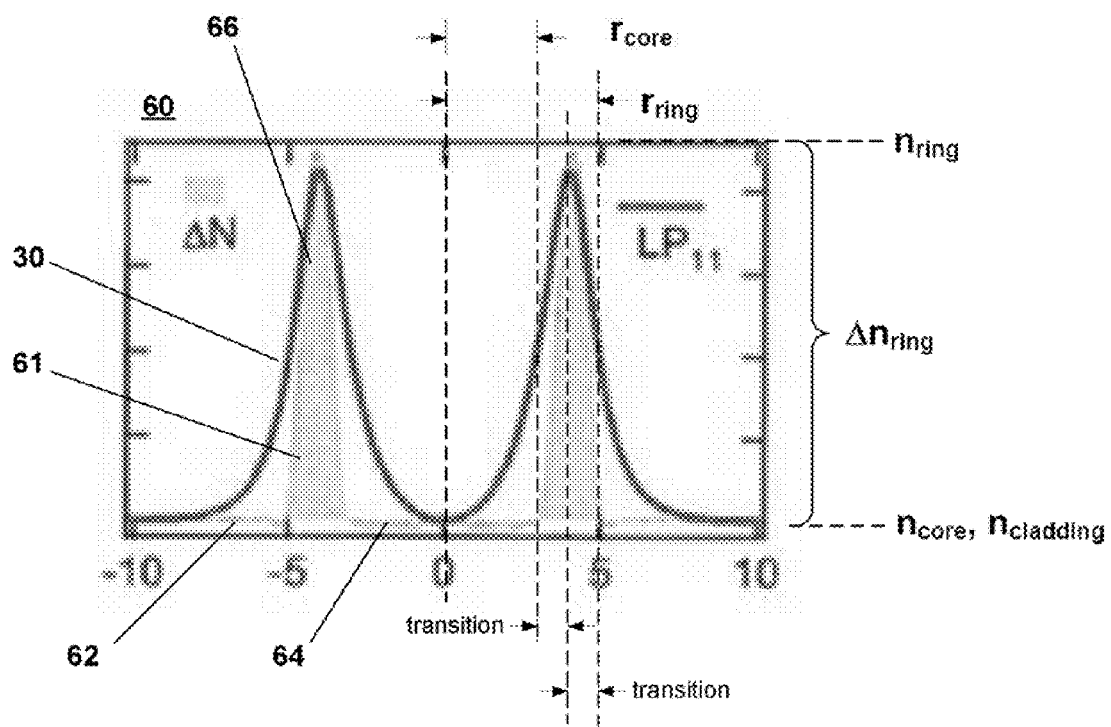
FIG. 6 is a composite profile, in which the FIG. 3 mode intensity profile is superimposed over the actual refractive index profile obtained from a fiber manufactured according to the FIG. 4 refractive index profile.

FIG. 6 shows a composite profile 60, showing the scalar $LP_{11}$ mode intensity profile 30 superimposed over the actual refractive index profile 61 of a fiber manufactured according to the desired refractive index profile 40 shown in FIG. 4. As shown in FIG. 6, the actual refractive index profile 61 includes a substantially flat outer cladding region 62, a core region 64, and a ring region 66. Of course, in an actual fiber, it is typically not possible to obtain a perfectly square "step" for the ring region 66. However, generally speaking, in order to achieve the desired results, the transition in the ring region from $n_{core}$ to $n_{ring}$ and the transition from $n_{ring}$ to $n_{cladding}$ should each have a radial width of approximately 1 micrometer or less.

Figure 7:
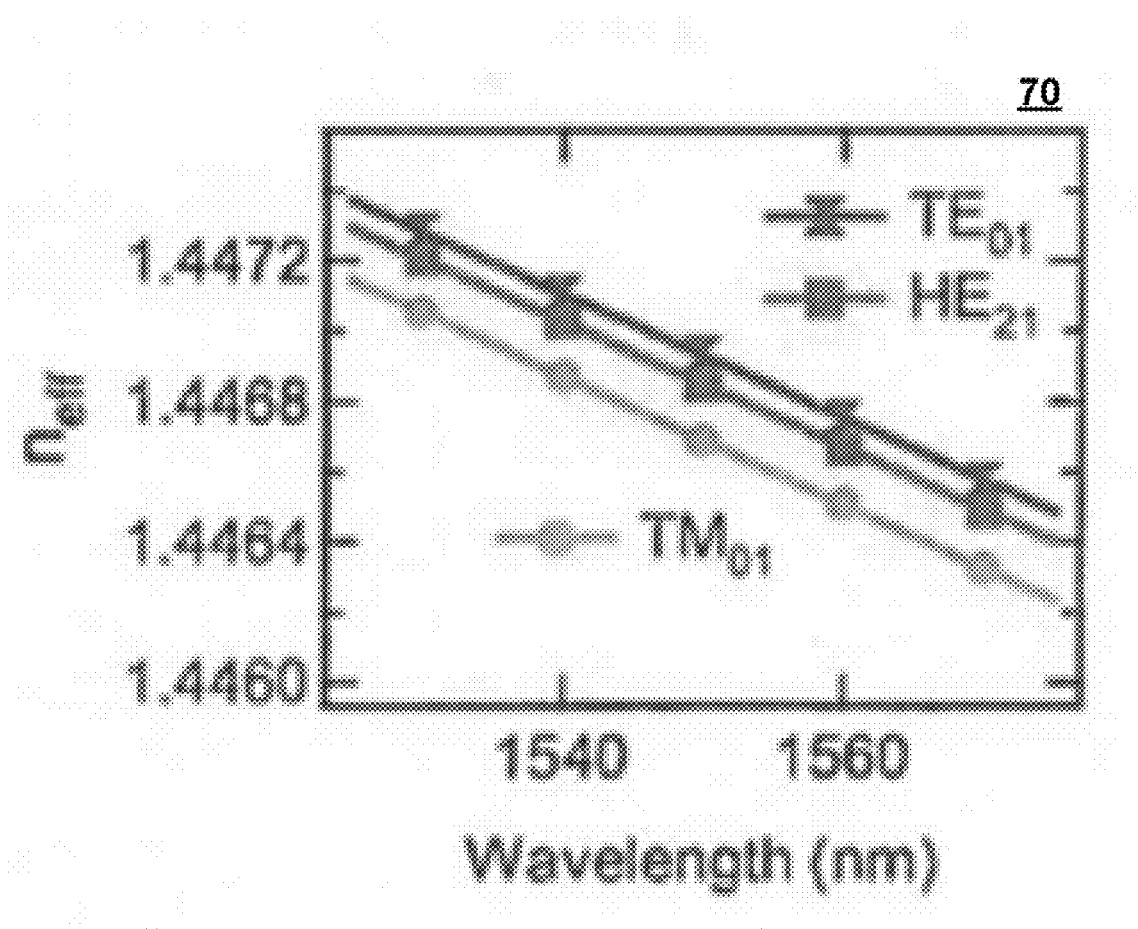
FIG. 7 is a graph in which effective refractive index $n_{eff}$ is plotted against wavelength for the $LP_{11}$ modes, which have been separated according to the present invention.

FIG. 7 is a graph 70 in which $n_{eff}$ is plotted against wavelength for the vector components $TM_{01}$, $HE_{21\ (even\ and\ odd)}$, and $TE_{01}$. In conventional fibers, the three curves would be indistinguishable in the scale of the FIG. 7 plot 70. It will be seen that $n_{eff}$ for the radially polarized $TM_{01}$ mode is separated from the other guided modes by at least $1 \times 10^{-4}$. It should be noted that this separation value is similar to the modal separations achieved in conventional PM fibers.

Figure 8:
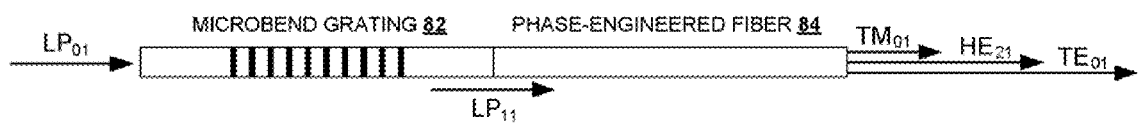
FIGS. 8 and 8A are diagrams of modules for converting a fundamental $LP_{01}$ into a cylindrically polarized beam according to a further aspect of the invention.

The phase-engineered fiber described above can be used to construct an all-fiber module for converting a fundamental $LP_{01}$ mode, which has an approximately Gaussian shape, into a radially polarized mode. FIG. 8 shows a diagram of such a module 80, not drawn to scale, which is constructed by coupling a microbend grating 82, or other suitable mode converter device, and the described phase-engineered fiber 84. An $LP_{01}$ mode is provided through a suitable fiber, such as a standard single-mode fiber (SMF) not shown, and is provided as an input into the microbend grating 82. The microbend grating 82 then converts the fundamental $LP_{01}$ into the first-higher order $LP_{11}$ mode. The $LP_{11}$ mode is then provided as an input into the phase-engineered fiber 84, which results in the above-described separation of the modes. A radially polarized beam is obtained by coupling to the $TM_{01}$ mode. An azimuthally polarized beam is obtained by coupling to the $TE_{01}$ mode.

Figure 8A:
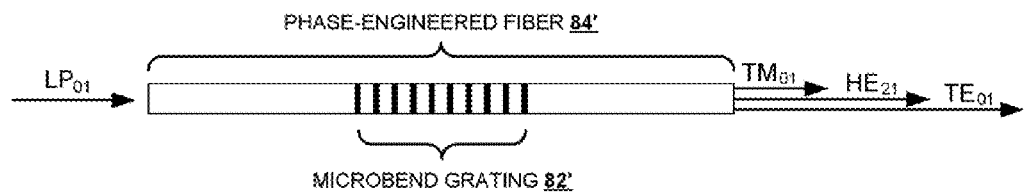

It should be noted that FIG. 8 illustrates a general example, in which the mode-converting fiber 82 is separate from the second fiber 84 that propagates the described mode. According to a further aspect of the invention, illustrated in FIG. 8A, not drawn to scale, a module 80' according to the present invention is constructed by fabricating a grating 82' directly into a portion of phase-engineered fiber 84'.

Figure 9:
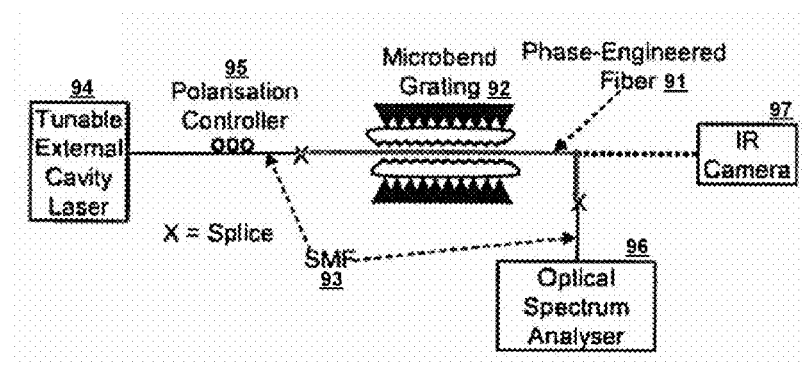
FIG. 9 is a diagram of a setup for testing the polarization characteristics of a phase-engineered fiber according to the invention.

FIG. 9 shows a setup 90 for testing the polarization properties of the described phase-engineered fiber. As shown in FIG. 9, the phase-engineered fiber 91 is spliced to a microbend grating 92. Lengths of single-mode fiber (SMF) 93 are used to connect the fiber 91 and grating 92 to a tunable external cavity laser 94 and polarization controller 95 at the input end, and an optical spectrum analyzer (OSA) 96 at the output end. The test results are recorded using an infrared camera 97.

Figure 10:
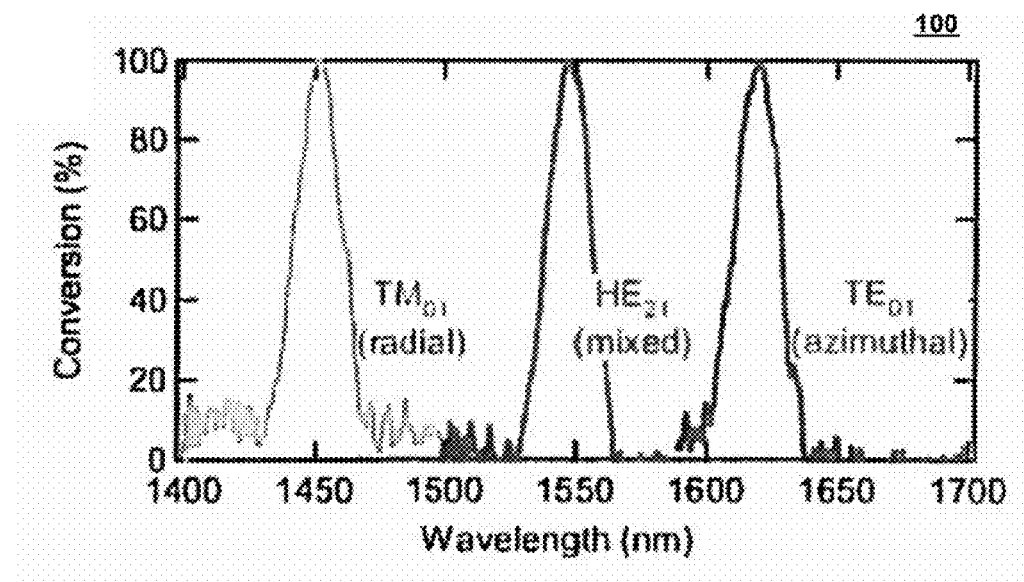
FIG. 10 is a graph in which conversion percentage is plotted against wavelength for the $LP_{11}$ modes, which have been separated according to the present invention.

FIG. 10 shows an OSA plot 100 where the conversion efficiency percentage is plotted against wavelength. The results of the test showed a conversion efficiency η of approximately 99.6%.

Figure 11:
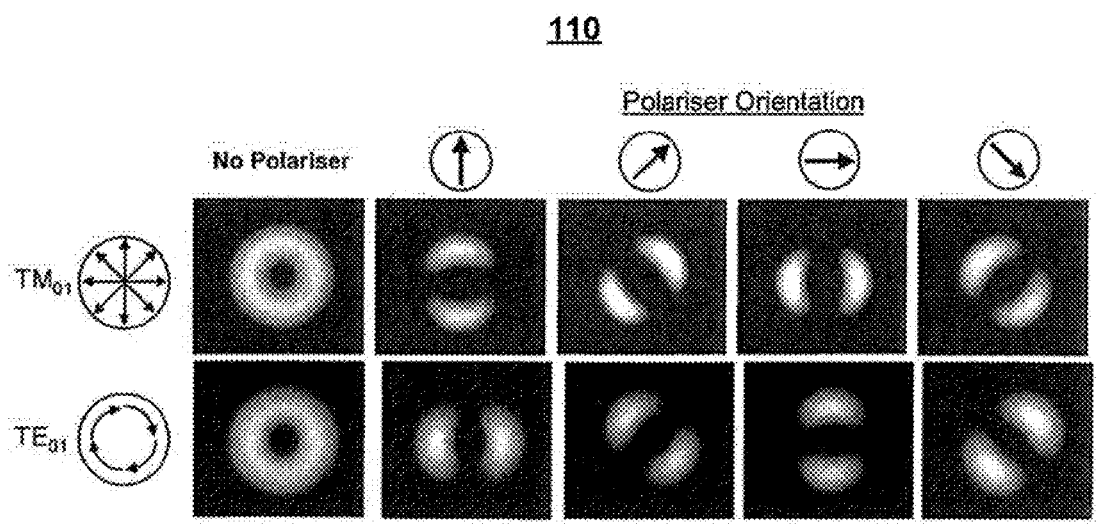
FIG. 11 is a series of near-field images illustrating the results obtained using the FIG. 9 testing setup.

FIG. 11 shows a series of experimentally recorded near-field images 110 yielding a clean annular intensity profile. Image rotation with the polarization controller in the beam path confirms the generation of the radially polarized $TM_{01}$ mode, and the azimuthally polarized $TE_{01}$ mode. Without a polarizer in the beam path, an annular shape is obtained. With the polarizer, only projections that are aligned with the polarizer are transmitted, confirming that clean $TM_{01}$ and $TE_{01}$ modes were generated, rather than a combination of cylindrical vector modes.

Figure 12:
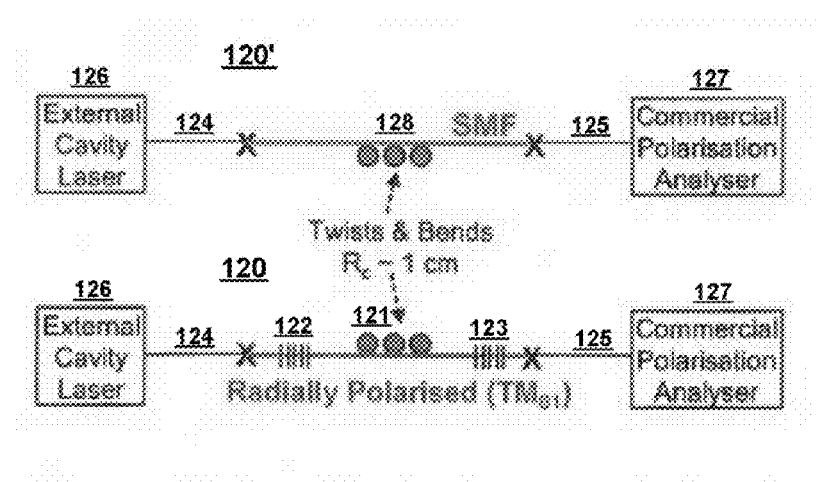
FIG. 12 is a diagram of a setup for testing the polarization characteristics of a phase-engineered fiber according to the invention, in which the fiber is perturbed by a series of twists and bends.

FIG. 12 shows a pair of testing setups 120 and 120' further illustrating PM operation using the described fiber. At the heart of setup 120 is a length of the phase-engineered fiber 121. Input and output gratings 122 and 123 enable splicing at the X's to SMFs 124 and 125 at the input and the output so that both ends of the device can be accessed with the $LP_{01}$ mode. The input SMF 124 is connected to an external cavity laser 126, and the output SMF 125 is connected to a commercial polarization analyzer 127. For purposes of comparison, setup 120' includes the elements of setup 120, but which the PM fiber 121 and input and output gratings 122 and 123 have been replaced by a length of SMF 128.

Figure 13:
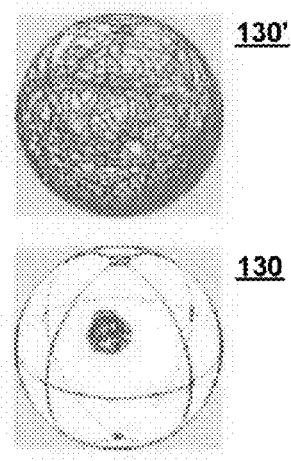
FIG. 13 are a pair of Poincaré spheres generated from the FIG. 12 testing setup.

To test its PM capability, the output state of polarization (SOP) was recorded as Poincaré sphere representations 130 and 130' in FIG. 13, while perturbing the fiber. The perturbations 129 and 129' comprise multiple twists and bends with radii-of-curvature $R_c$ down to 1 cm. FIG. 13 shows that while such perturbations fill up to the Poincaré sphere in the case of SMF (sphere 130'), only small changes in the SOP occur with the described fiber (sphere 130). The PER, measured with a rotating polarizer followed by a detector, was 28.7 dB. With the polarizer fixed, there were recorded 0.6 dB power excursions. Assuming the excursions to be due to random coupling in a 2-path interferometer, a mode extinction level of 29.2 dB was calculated—almost identical to the measured PER. While the high level of PER confirms PM operation, these values are not competitive with commercial PM fibers. However, theoretically optimized fiber designs that are conceptually similar show much large $n_{eff}$ separations, facilitating the prospect of PER values higher than those of commercial PM fibers.

Figure 14:
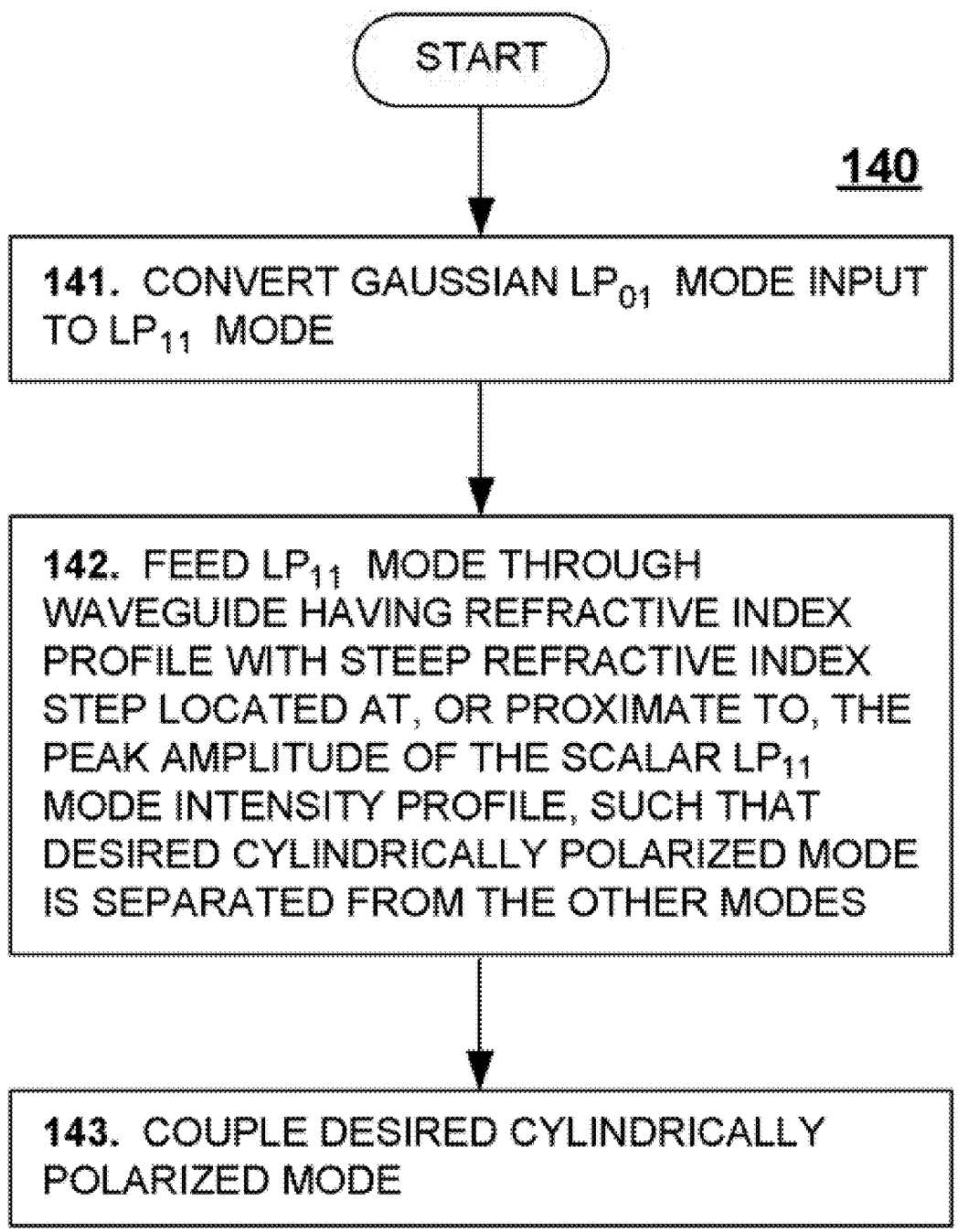
FIG. 14 is a flowchart of an overall technique according to the present invention.

FIG. 14 is a flowchart of an overall technique 140, according to the above-described aspects of the invention, for generally a cylindrically polarized beam. In step 141, a Gaussian $LP_{01}$ mode input is converted to a higher-order $LP_{11}$ mode. In step 142, the $LP_{11}$ mode is fed through a waveguide having a refractive index profile with a steep refractive index step located at, or proximate to, the peak amplitude of the scalar $LP_{11}$ mode intensity profile, such that a desired cylindrically polarized mode, e.g., the $TM_{01}$ mode or the $TE_{01}$ mode, is separated from the other modes. In step 143, the desired cylindrically polarized mode is coupled.

In summary, there is described herein what is believed to be the first PM fiber that is strictly circularly symmetric, in geometry and refractive index. These properties could facilitate simple splicing and construction of PM fiber devices, and potentially offer extension ratios higher than conventional PM fibers. One area where it may have significant impact is high-power lasers and amplifiers, since cylindrical vector modes can be much larger in mode area. This fiber is conceptually enabled by a design in which a stable, bend-resistant, and mode-mixing-resistant cylindrical vector beams can be generated. With grating conversion efficiencies of approximately 99.6%, the described technique for generating these modes is an attractive alternative to the significantly more complex free-space systems currently employed. Hence, these devices may also find applications in the diverse areas of science and technology that rely on cylindrical vector beam.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for generating a cylindrically polarized beam, comprising:
    (a) providing an optical signal comprising a fundamental $LP_{01}$ mode;
    (b) providing an input optical fiber that supports propagation of the optical signal in the $LP_{01}$ mode;
    (c) using a mode converter device to convert the $LP_{01}$ mode input into a higher-order $LP_{11}$ mode output, the higher-order $LP_{11}$ mode comprising a linear combination of cylindrically polarized $TM_{01}$ and $TE_{01}$ modes, and mixed $HE_{21}$(even) and $HE_{21}$(odd) modes;
    (d) causing the $LP_{11}$ mode output to propagate through a phase-engineered fiber coupled to the mode converter device, wherein the phase-engineered fiber has a refractive index profile that comprises a steep refractive index step proximate to a peak amplitude of a mode intensity profile of the $LP_{11}$ mode output, such that at least one of the cylindrically polarized modes has an effective refractive index sufficiently separated from effective refractive indices of the mixed modes;
    (e) selecting the at least one separated cylindrically polarized mode; and
    (f) providing the at least one separated cylindrically polarized mode as an output.

2. The method of claim 1, wherein the optical signal is a coherent light beam.

3. The method of claim 1, wherein the at least one separated cylindrically polarized mode is radially polarized $TM_{01}$ mode.

4. The method of claim 1, wherein the at least one separated cylindrically polarized mode is azimuthally polarized $TE_{01}$ mode.

5. The method of claim 1, the effective refractive index of the at least one separated cylindrically polarized mode is separated from the effective refractive indices of the mixed modes by a factor of at least $1 \times 10^{-4}$.

6. The method of claim 1, wherein the refractive index step is at least approximately 0.015.

7. The method of claim 6, wherein the refractive index step comprises a transition region no greater than approximately 1.0 micrometer in radial width.

8. The method of claim 1, wherein the mode converter device is a grating fabricated into a portion of the phase-engineered fiber.

9. The method of claim 8, wherein the grating is a microbend grating.

10. A fiber-based module for converting a fundamental $LP_{01}$ mode of an optical signal into a cylindrically polarized mode, comprising:
    a mode converter device for converting the fundamental $LP_{01}$ mode into a higher-order $LP_{11}$ mode output, the higher-order $LP_{11}$ mode comprising a linear combination of modes, including cylindrically polarized $TM_{01}$ and $TE_{01}$ modes, and mixed $HE_{21}$(even) and $HE_{21}$(odd) modes; and
    a phase-engineered fiber coupled to the mode converter device through which the $LP_{11}$ mode output propagates, the fiber having a refractive index profile comprising a steep refractive index step proximate to a peak amplitude of a mode intensity profile of the $LP_{11}$ mode output, such that at least one of the cylindrically polarized modes has an effective refractive index sufficiently separated from effective refractive indices of the mixed modes to allow for coupling to the at least one cylindrically polarized mode with minimal coupling to the mixed modes.

11. The module of claim 10, wherein the mode converter device is a grating fabricated into a portion of an input optical fiber.

12. The module of claim 11, wherein the grating is a microbend grating.

* * * * *